United States Patent
Alelyunas et al.

(10) Patent No.: US 10,419,047 B1
(45) Date of Patent: Sep. 17, 2019

(54) PERFORMING NOISE CANCELLATION IN RADIO SIGNALS USING SPECTRAL DUPLICATION

(71) Applicant: Silicon Laboratories Inc., Austin, TX (US)

(72) Inventors: Carl Harry Alelyunas, Austin, TX (US); Russell Croman, Buda, TX (US); Thomas Glen Ragan, Austin, TX (US); Tarang Shah, Round Rock, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/225,722

(22) Filed: Dec. 19, 2018

(51) Int. Cl.
*H04B 1/10* (2006.01)
*H04B 1/00* (2006.01)

(52) U.S. Cl.
CPC ... *H04B 1/1027* (2013.01); *H04B 2001/1072* (2013.01)

(58) Field of Classification Search
CPC ......... H04B 1/0475; H04B 3/23; H04M 9/08; H04W 72/082
USPC ............. 455/63.1, 67.13, 295, 296, 297
See application file for complete search history.

(56) References Cited

U.S. PATENT DOCUMENTS

| | | | |
|---|---|---|---|
| 7,436,252 B2 | 10/2008 | Taipale et al. | |
| 7,570,933 B2 | 8/2009 | Taipale et al. | |
| 7,986,929 B2 | 7/2011 | Krone | |
| 8,050,646 B2 * | 11/2011 | Gozen | H03G 3/345 455/296 |
| 8,781,137 B1 * | 7/2014 | Goodwin | H04R 3/005 381/94.1 |
| 8,976,969 B2 | 3/2015 | Elenes et al. | |
| 9,735,748 B2 | 8/2017 | May et al. | |
| 9,967,651 B2 * | 5/2018 | Ozluturk | G10K 11/175 |
| 10,037,755 B2 * | 7/2018 | Kwan | G10K 11/17873 |
| 10,255,899 B2 * | 4/2019 | Itabashi | B60R 11/02 |

OTHER PUBLICATIONS

U.S. Appl. No. 16/026,131, filed Jul. 3, 2018, entitled, "System, Apparatus and Method For Time Synchronization of Delayed Data Streams by Matching of Wavelet Coefficients," by Bradley Arthur Wallace, et al.
Silicon Laboratories, "High-Performance Automotive AM/FM Radio Receiver and HD Radio™/ DAB/DAB+/DMB/DRM Tuner," Aug. 25, 2014, 3 pages.
George Tzanetakis, et al., "Audio Analysis using the Discrete Wavelet Transform," 2001, 6 pages.

* cited by examiner

*Primary Examiner* — Quochien B Vuong
(74) *Attorney, Agent, or Firm* — Trop, Pruner & Hu, P.C.

(57) ABSTRACT

In one embodiment, a noise cancellation circuit includes: a window generator to generate a window having a first set of samples; a band splitter to split the window into pairs of symmetric frequency components; a processing circuit, for each of the pairs, to: compare a first magnitude of a first symmetric frequency component to a second magnitude of a second symmetric frequency component and modify one of the components based at least in part on the comparison; an integrator to integrate the pairs output from the processing circuit; and a second window generator to generate a second window having a second set of samples.

20 Claims, 9 Drawing Sheets

PERFORMING NOISE CANCELLATION IN RADIO SIGNALS USING SPECTRAL DUPLICATION

BACKGROUND

Radio receivers are used to receive and process incoming wireless signals. In many environments, there are noise challenges, due to a wide variety of potentially interfering sources. Such sources may include interfering radio channels that are closely spaced with a desired radio channel. Other sources may include sources of interference that are locally present with the radio receiver. For example, different electrical compenents, either in a single integrated circuit (IC) with the radio receiver or closely located with the IC, can operate at frequencies that create noise at one or more frequencies at which the radio receiver operates.

With regard to amplitude modulation (AM) radios, a new and increasing source of interference is found in receivers that operate in electric and electric hybrid vehicles. This is so, as electric motors of these vehicles generate interference in the AM band, such that receiving an AM broadcast signal in an automotive radio without unwanted noise is much more difficult. In fact, some manufacturers of electric cars are even giving up on AM radios completely.

SUMMARY OF THE INVENTION

In one aspect, a method includes: receiving, in a noise cancellation circuit of a receiver, a plurality of samples of a downconverted signal; separating the plurality of samples into a plurality of sub-bands; for each of corresponding pairs of the plurality of sub-bands, comparing a first value based on a first component of the corresponding pair with a second value based on a second component of the corresponding pair; based at least in part on the comparing, adjusting at least a portion of one of the first and second components of the corresponding pair with at least a portion of the other of the first and second components of the corresponding pair; integrating the plurality of sub-bands into a second plurality of samples; and outputting the second plurality of samples for demodulation.

In an example, the method further comprises receiving a complex signal and forming an overlapping window having the plurality of samples. The method may also include: performing a complex fast Fourier transform to separate the plurality of samples into the plurality of sub-bands; and performing a complex inverse fast Fourier transform to integrate the plurality of sub-bands into the second plurality of samples. In an embodiment, the separating and the integrating comprises a unity function.

In an example: calculating the first value comprises calculating a first magnitude for the first component, the first component comprising a positive frequency component of the corresponding pair of the plurality of sub-bands; and calculating the second value comprises calculating a second magnitude for the second component, the second component comprising a negative frequency component of the corresponding pair of the plurality of sub-bands. The method further includes comparing the first magnitude to the second magnitude to obtain a comparison result. In response to the comparison result exceeding a first threshold, one of the positive frequency component and the negative frequency component is replaced with a complex conjugate of the other of the positive and negative frequency components.

In an example, the method further comprises in response to the comparison result exceeding a second threshold, combining at least a portion of one of the positive frequency component and the negative frequency component with at least a portion of the other of the positive frequency component and the negative frequency component, the second threshold less than the first threshold.

In another aspect, an apparatus comprises: an analog front end circuit to receive and downconvert an AM signal to a second frequency signal; a digitizer to digitize the second frequency signal into a plurality of samples; and a noise cancellation circuit coupled to the digitizer to receive the plurality of samples. In an embodiment, the noise cancellation circuit includes: a window generator to generate a window having a first set of the plurality of samples; a band splitter to split the window into a plurality of pairs of symmetric frequency components; a processing circuit, for each of the plurality of pairs, to: compare a first magnitude of a first symmetric frequency component to a second magnitude of a second symmetric frequency component and modify one of the first symmetric frequency component and a second symmetric frequency component based on the comparison; an integrator to integrate the plurality of pairs output from the processing circuit; and a second window generator to generate a second window having a second set of samples. The apparatus may further include a demodulator coupled to the noise cancellation circuit to demodulate the second set of samples to output a demodulated AM signal.

In an example, the band splitter comprises a fast Fourier transform engine and the integrator comprises an inverse fast Fourier transform engine. The processing circuit may include a plurality of individual circuits, each of the plurality of individual circuits comprising: a first value generator to generate the first magnitude of the first symmetric frequency component, the first symmetric frequency component comprising a complex signal; a second value generator to generate the second magnitude of the second symmetric frequency component, the second symmetric frequency component comprising a complex signal; and a comparator to compare the first magnitude to the second magnitude and to output a comparison result based thereon.

In an example, the apparatus further comprises: a controller to receive the comparison result and to output one or more control signals based on a comparison of the comparison result to at least one threshold; and a blending circuit to modify the one of the first symmetric frequency component and the second symmetric frequency component based on the one or more control signals. The controller may replace the second frequency component with the first frequency component, when the comparison result exceeds the at least one threshold. The at least one threshold may be a dynamic threshold based on a dynamically calculated noise floor. The controller may cause the blending circuit to output the first symmetric frequency component and the second symmetric frequency component unmodified when the comparison result is less than the at least one threshold. The window generator may generate the window comprising at least some overlapping samples of a prior window, and the second window generator may generate the second window that overlaps at least a portion of the prior window. The noise cancellation circuit may remove noise present in a first sideband of the AM signal caused by one or more electrical components of a vehicle, where the apparatus is a radio receiver of the vehicle.

In yet another aspect, a system includes: an antenna to receive an AM signal; a tuner coupled to the antenna to receive and process the AM signal to output a downconverted modulated signal; a noise cancellation circuit coupled to the tuner to: generate a window having a first set of a plurality of samples of the downconverted modulated signal; split the window into a plurality of pairs of symmetric frequency components; for one or more of the plurality of pairs, to: compare a first magnitude of a first symmetric frequency component to a second magnitude of a second symmetric frequency component and modify one of the first symmetric frequency component and the second symmetric frequency component based at least in part on the comparison; and integrate the plurality of pairs into a second window having a second set of samples.

The system may further include a demodulator coupled to the noise cancellation circuit to demodulate the second set of samples to output a signal stream and an output device to play the signal stream. The noise cancellation circuit may modify the one of the first symmetric frequency component and the second symmetric frequency component by replacement of the second frequency component with a representation of the first frequency component, when a comparison result of the first magnitude to the second magnitude exceeds a threshold. The system may be a vehicle infotainment system, where the noise cancellation circuit is to compensate for a source of noise present in an electric vehicle or a hybrid electric vehicle having the vehicle infotainment system.

DETAILED DESCRIPTION

In various embodiments, a radio receiver may be provided with noise cancellation circuitry to remove unwanted noise present in a given channel of interest. Embodiments herein are described in the context of AM signals that include upper and lower sidebands, which when of a perfect signal have identical complex conjugates of each other. At a high level, embodiments may identify undesired noise present in one of a pair of sidebands that, in a perfect situation, include the same content (although inverted with respect to each other). When noise is identified in one of these sidebands, one of multiple signal processing techniques may be performed to remove such noise, to allow demodulation and further processing of a noise-compensated signal.

More specifically embodiments herein may process a set of time-based samples that form a window, convert these time-based samples to frequency-based samples, identify noise (in some cases), perform appropriate processing, and re-integrate the frequency domain information back to time domain samples for demodulation and further processing.

Figure 1:
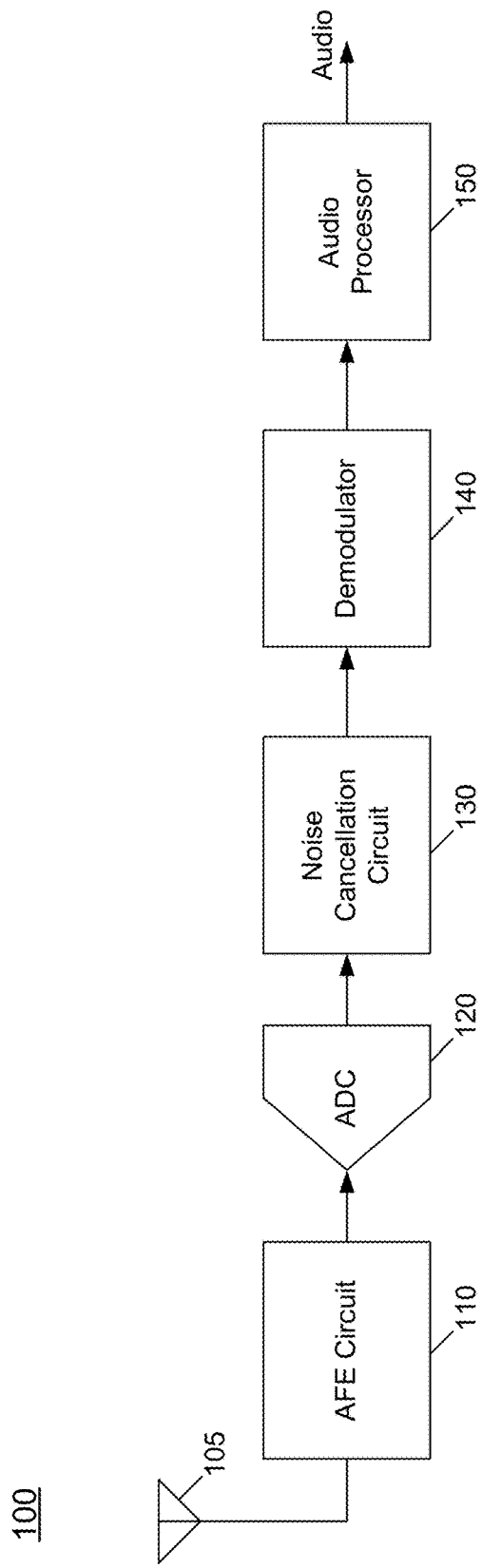
FIG. 1 is a block diagram of a receiver in accordance with an embodiment.

Referring now to FIG. 1, shown is a block diagram of a receiver in accordance with an embodiment. As shown in FIG. 1, receiver 100 is a receiver for handling incoming AM signals. In one embodiment, receiver 100 may be implemented on a single semiconductor die, as incorporated into a given integrated circuit. Understand while only an AM receiver is shown for ease of illustration and discussion, a given receiver IC may include signal processing paths for multiple bands including AM, FM, satellite and so forth.

As shown, receiver 100 is coupled to an antenna 105 that is configured to receive incoming RF signals. For purposes of discussion, assume that the RF signals include an AM radio channel of interest. The received RF signals are provided to an analog front end (AFE) circuit 110, which may perform various processing on the incoming RF signal, including amplification, e.g., in a low noise amplifier (LNA), downconversion via a complex mixer to a lower frequency such as a baseband or intermediate frequency, filtering and additional gain control and so forth. In turn, the downconverted signal is provided to a digitizer, namely an analog-to-digital converter (ADC) 120, which digitizes the information and provides a digital stream to a noise cancellation circuit 130.

In embodiments, noise cancellation circuit 130 may identify unwanted interference in the received signal stream. As will be described herein, noise cancellation circuit 130 may be configured to identify presence of such unwanted noise by identifying differences between the signal content in positive and negative sidebands of a channel of interest, which include the same message information. That is, an AM signal is formed of two sidebands which when originally transmitted are identical except for an inversion of the imaginary component. An interferer will present as an imbalance between the upper and lower sidebands.

To identify noise, noise cancellation circuit 130 may be configured to filter short periods of the incoming complex signal (as downconverted) into multiple frequency bands symmetrical around a carrier frequency. Thereafter, noise cancellation circuit 130 may analyze pairs of symmetrical bands, in magnitude and phase. In an embodiment, the least likely band to contain interference may be selected and duplicated into its complement, and the short section of the incoming complex signal is restored and concatenated to create a new output signal. The new output signal can then be demodulated to create an interference-reduced audio signal.

More specifically, noise cancellation circuit 130 may, in embodiments, use a band-splitting technique to split each of the positive and negative sidebands into a plurality of sub-bands. Then signal processing is performed on the corresponding sub-bands. Such processing, in an embodiment, includes comparisons, adjusting of at least one of the sidebands, and optionally other processing, and then re-integrating the processed sub-bands into a processed modulated data stream.

In the embodiment, of FIG. 1, noise cancellation circuit 130 is implemented as a hardware circuit. However, in other embodiments noise cancellation as described herein may be performed in a general-purpose processor such as a digital signal processor, microcontroller or so forth. To this end, such hardware processor may execute instructions to perform the noise cancellation. In different implementations, these instructions may be stored in one or more non-transitory storage media, such as a firmware storage, flash memory or so forth.

As further illustrated in FIG. 1, the processed modulated data stream may be provided to a demodulator 140 which may demodulate the signal stream and provide demodulated content to an audio processor 150, which may perform additional optional audio processing, resulting in an audio output. Understand while shown at this high level in the embodiment of FIG. 1, many variations and alternatives are possible.

Figure 2:
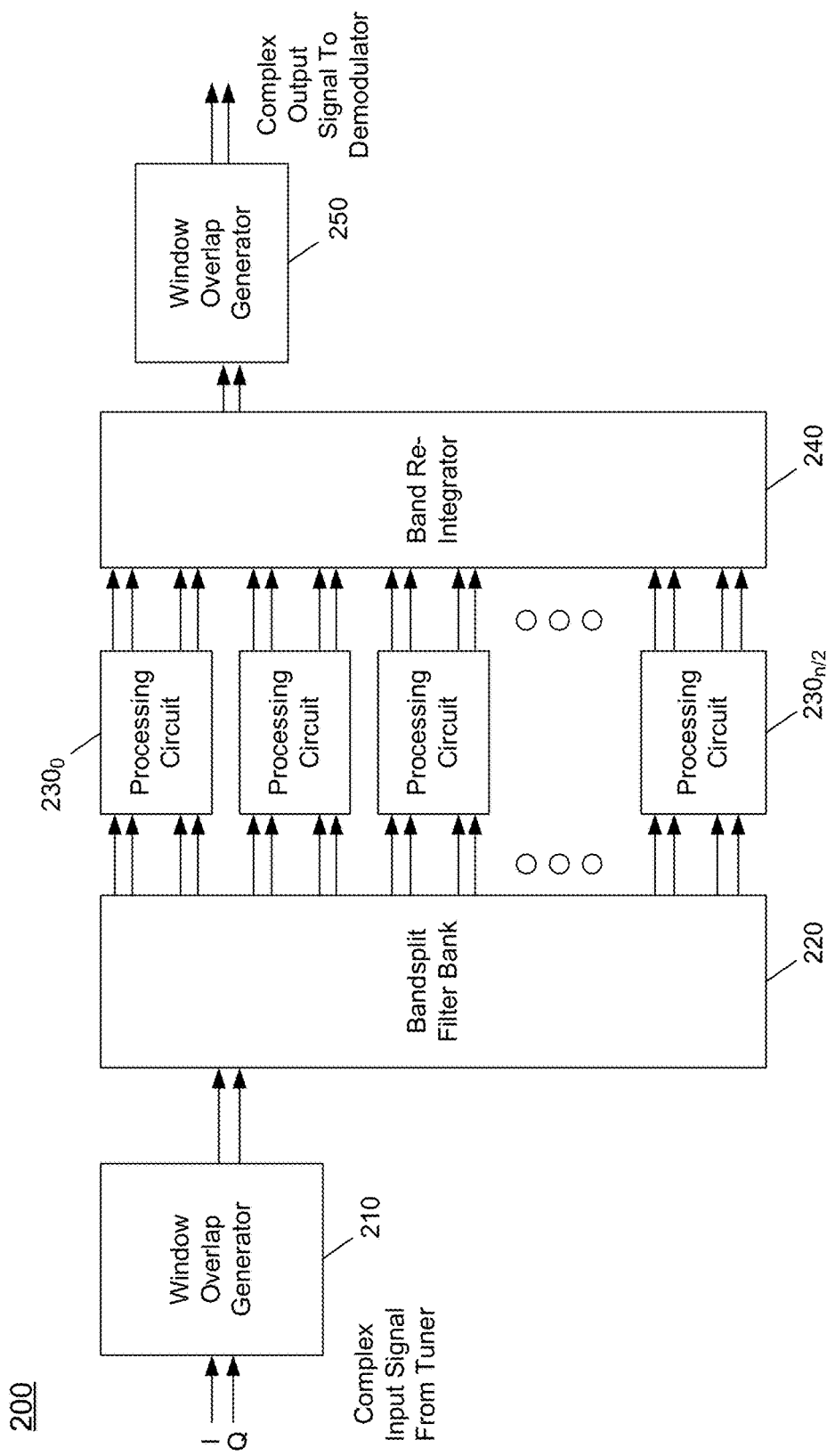
FIG. 2 is a block diagram of a noise cancellation circuit in accordance with an embodiment.

Referring now to FIG. 2, shown is a block diagram of a noise cancellation circuit in accordance with an embodiment. As shown in FIG. 2, noise cancellation circuit 200 may correspond to a high level view of noise cancellation circuit 130 of FIG. 1. As seen, incoming complex input signals are received from a tuner portion of a receiver in a window overlap generator 210. In embodiments, window overlap generator 210 may generate overlapping windows of received samples. In a particular embodiment described further herein, a Hann window generator may be used to form overlapping windows, e.g., of 2048 samples. As seen, an overlapping window is provided to a bandsplit filter bank 220, which may split these samples of the overlapping window into a plurality of sub-bands, e.g., N sub-bands. In one example, N may equal 2048.

In turn, corresponding pairs of sub-bands, namely corresponding positive and negative frequency components, are provided to a plurality of processing circuits $230_0$-$230_{n/2}$. Although different implementations are possible, in one embodiment each processing circuit 230 may be implemented as a compare, select and duplicate circuit to compare the positive and negative frequency components, select one of the positive and negative frequency components based on the comparison and duplicate the selected component to the other side (complex-conjugated as appropriate), thus replacing the original unselected frequency component with a representation of the selected frequency component. The resulting processed sub-bands output from each of processing circuits 230 is provided to a band re-integrator 240 which re-integrates, in a unity process, the individual processed sub-bands into a set of samples that are provided to a window overlap generator 250. Window overlap generator 250 converts the processed sample block into a stream of samples of complex signals to be output to a demodulator. Understand while shown at this high level in the embodiment of FIG. 2, many variations and alternatives are possible.

While different manners of performing the band splitting and processing operations discussed above are possible, such as wavelet decomposition or overlapping bandpass filters, in a particular embodiment, a fast Fourier transform (FFT) may be used for the band splitting operation and a corresponding inverse FFT (IFFT) may be used for the re-integration process.

Figure 3:
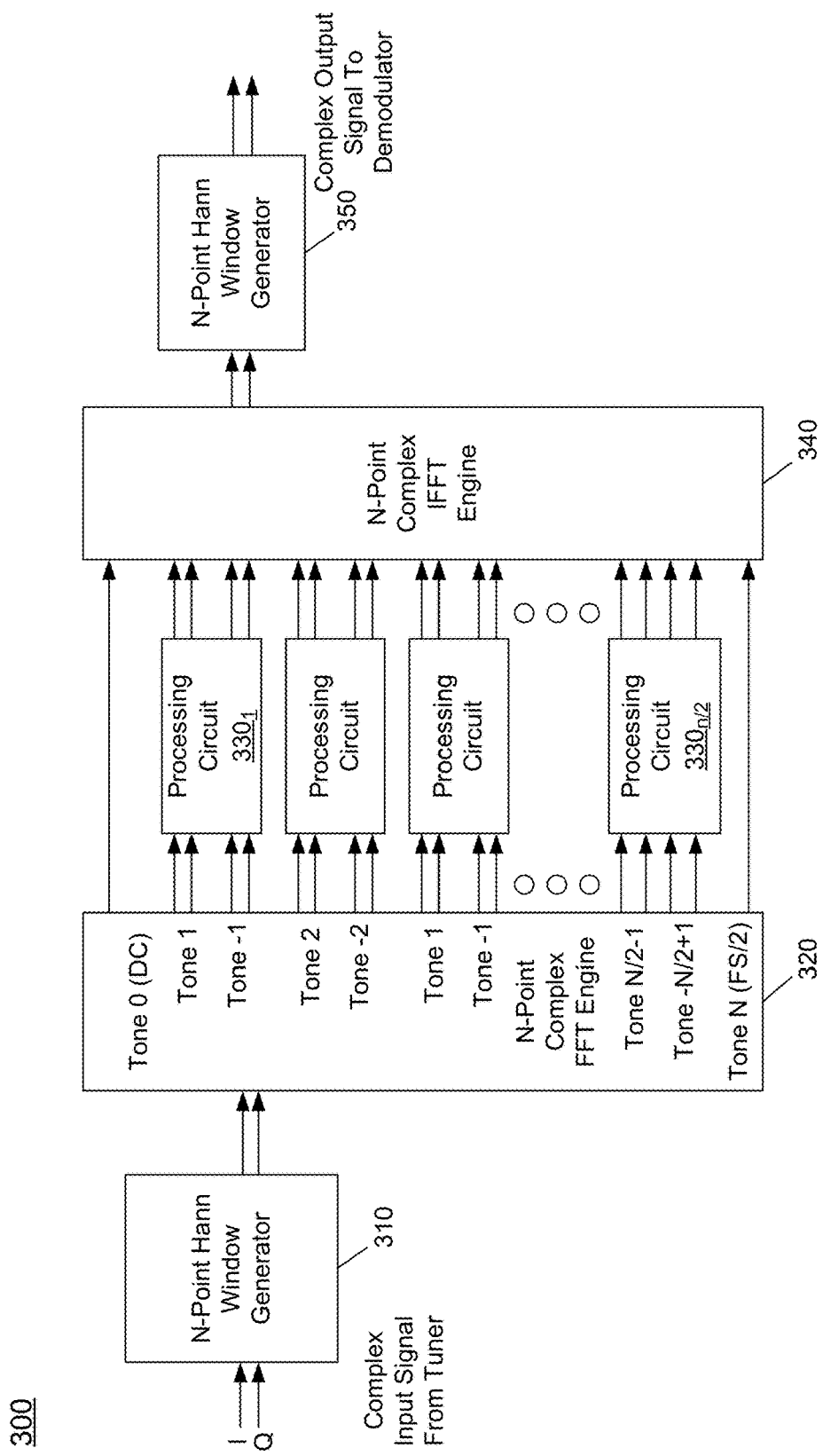
FIG. 3 is a block diagram of a noise cancellation circuit in accordance with another embodiment.

Referring now to FIG. 3, shown is a block diagram of a noise cancellation circuit in accordance with another embodiment. As shown in FIG. 3, noise cancellation circuit 300 is another implementation of noise cancellation circuit 130 of FIG. 1. As seen, incoming complex input signals are received from a tuner portion of a receiver in an N-point Hann window generator 310, which generates windows of received samples (e.g., 2048 samples), overlapped by 50%. An overlapping window is provided to an N-point complex FFT engine 320, which may split these time domain samples of the overlapping window into a plurality of sub-bands in the frequency domain, e.g., N sub-bands.

In turn, corresponding pairs of sub-bands, namely corresponding positive and negative frequency components, are provided to a plurality of processing circuits $330_1$-$330_{n/2}$.

Based on identification of a given one of a corresponding pair that has greater noise content and a given policy, a noise cancellation process may be performed on at least one of the frequency components. As will be described in more detail, each processing circuit 330 may perform one or more computations and an analysis to identify the frequency component with greater noise content. In response to this identification, processing circuit 330 then may take some action with respect to at least one of the frequency components to modify, adjust or otherwise compensate for this identified noise.

The resulting processed sub-bands output from each of processing circuits 330 is provided to an N-point complex IFFT engine 340 which re-integrates, in a unity process, the individual processed sub-bands from the frequency domain into a set of samples in the time domain that are provided to an N-point Hann window generator 350. Window generator 350 converts the processed sample block into a stream of samples of complex signals to be output to a demodulator. As with the input window, note that the output window generated in window generator 350 can be an overlapping Hann window, overlapped by 50%. Understand while shown at this high level in the embodiment of FIG. 3, many variations and alternatives are possible. For example, in other embodiments another type of window function and shape may be chosen depending on desired complexity and frequency characteristics, as long as an input/output pair of windowing functions leaves the stream of samples unaltered. For example, the input window function could be a triangular window with 50% overlap and the output window could be a rectangular window with 50% overlap.

Figure 4:
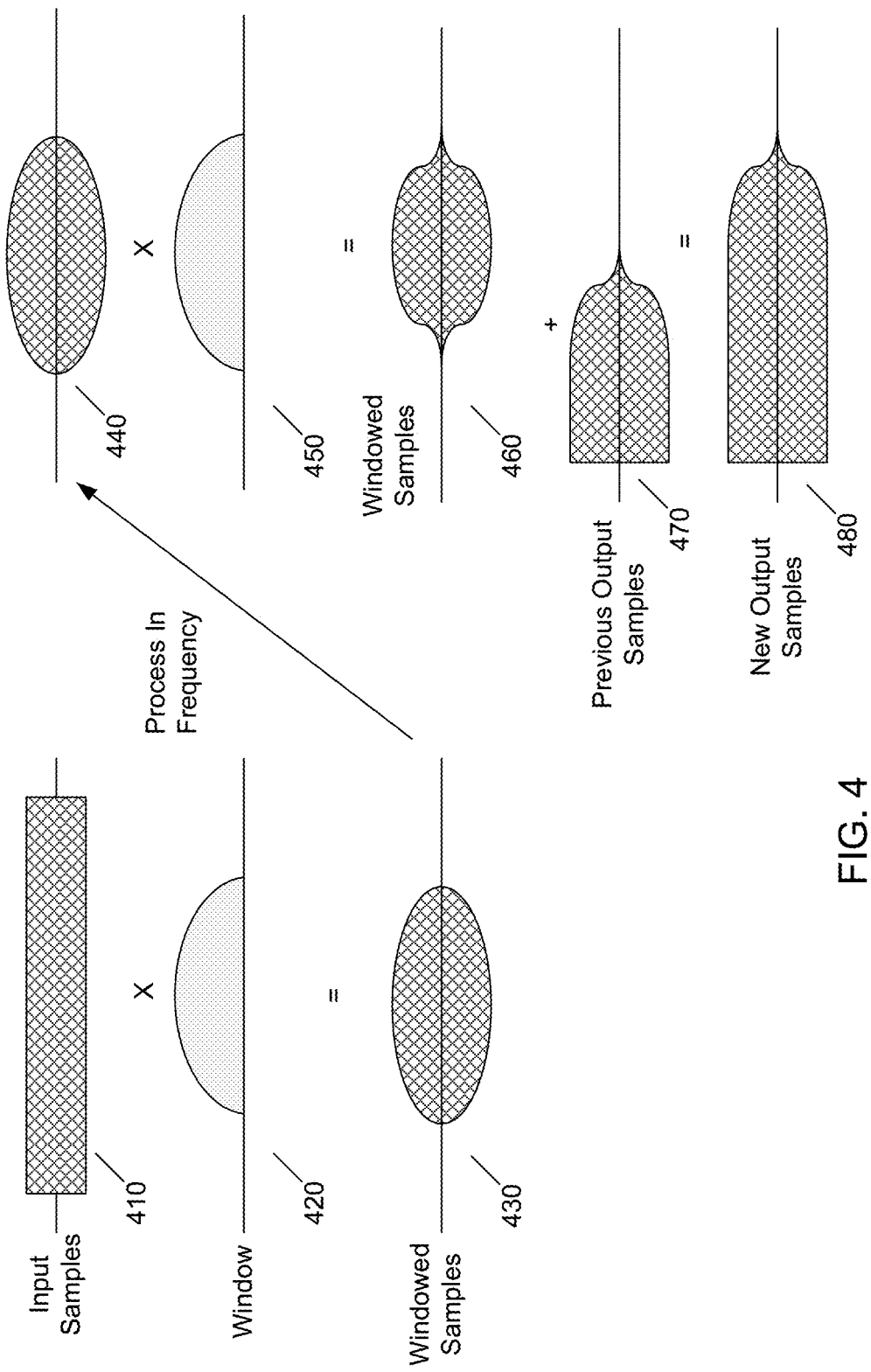
FIG. 4 is an illustration of the various operations performed according to an embodiment.

As discussed above, in a particular embodiment, a Hann window function may be used to generate overlapping windows to be processed as described herein. Referring now to FIG. 4, shown is an illustration of the various operations performed in generating overlapping windows for processing as described herein and then reintegrating such overlapping windows into a set of output samples. As illustrated in FIG. 4 at item 410, a plurality of input samples are provided. These input samples are multiplied with a Hann window of length N, illustrated at item 420, namely a half period of a sine wave (extending from 0 to $\pi$). The resulting set of windowed samples 430 is provided for band splitting, processing and reintegrating. Thereafter, the processed samples after reintegration (at item 440) are multiplied by the same Hann window at item 450, resulting in a second set of windowed samples 460. Then as shown, windowed samples 460 are accumulated with previously output samples at item 470 to thus output a set of output samples 480. Previous samples 470 may be an N/2 overlap of an output sample stream. Note that by using a squared Hann window overlapped by half results in a unity window pair, resulting in good transient and frequency characteristics.

Figure 5:
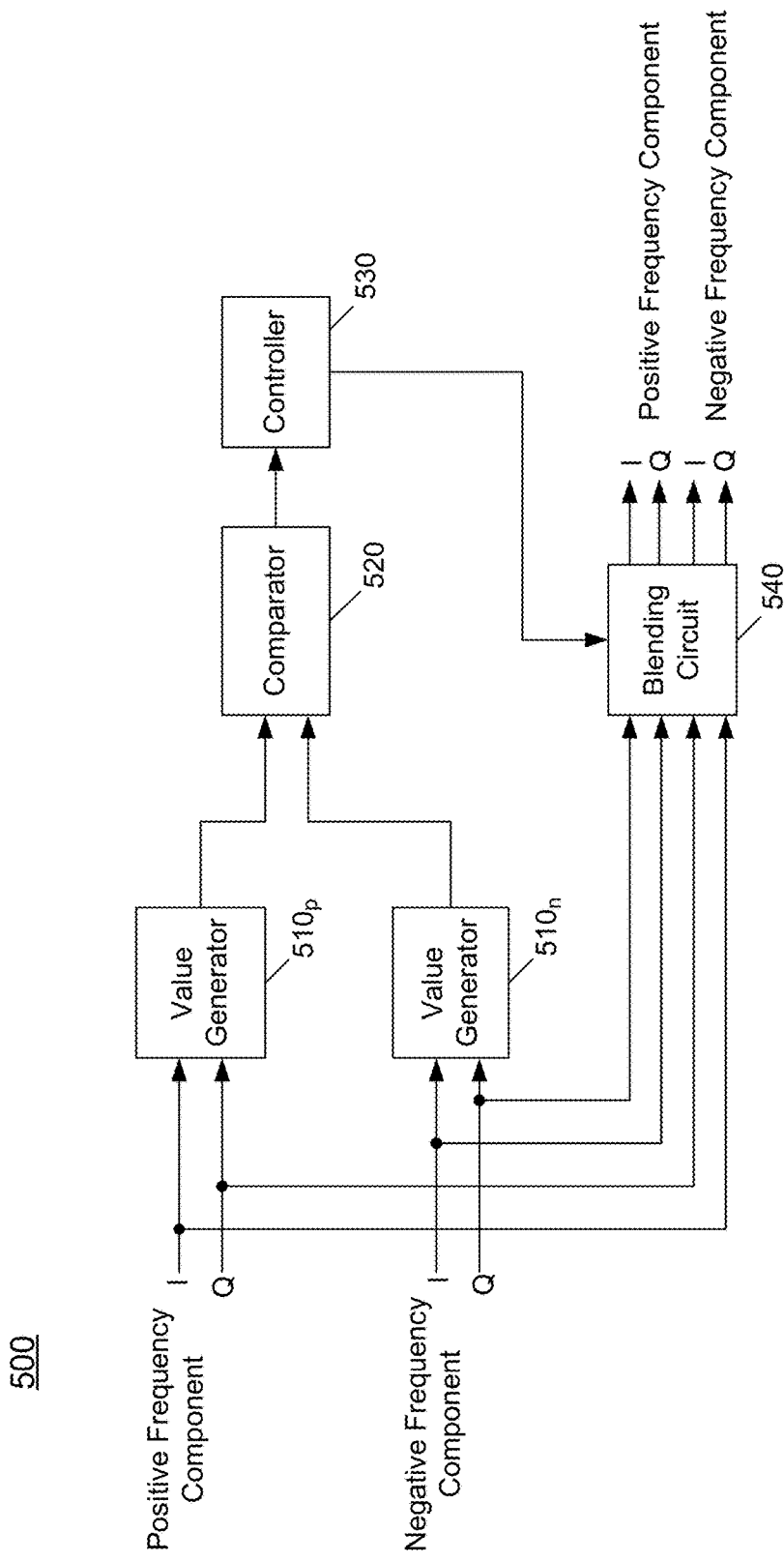
FIG. 5 is a block diagram of a processing circuit in accordance with an embodiment.

Referring now to FIG. 5, shown is a block diagram of a processing circuit in accordance with an embodiment. As shown in FIG. 5, processing circuit 500 may be a single one of multiple such processing circuits, each configured to operate on a pair of corresponding sub-bands, e.g., of a given positive and negative frequency component. As seen, incoming complex signals are received for the positive and negative frequency components in corresponding value generators $510_{p,n}$. In an embodiment, each value generator 510 may generate a magnitude value corresponding to a magnitude of the complex frequency components. In an embodiment, each value generator 510 may generate a magnitude as: $I^2+Q^2$. In another embodiment, the magnitude may be a square root of this sum. Of course, other magnitude calculations are possible in other embodiments.

In any event, the magnitudes generated in value generators $510_{p,n}$ are provided to a comparator 520. In an embodiment, comparator 520 may be configured to output a comparison value corresponding to a difference between the magnitudes. When the magnitudes are different, this is an indication of presence of an interfering signal or other unwanted noise. In one embodiment, comparator 520 may indicate the difference value and which of the magnitudes is greater. This comparison output is provided to a controller 530.

In embodiments, controller 530 is configured to control a blending circuit 540. As illustrated, blending circuit 540 receives the incoming positive and negative frequency components. Based upon control signals from controller 530 (which in turn generates the control signals based on the comparison result), blending circuit 540 may output potentially adjusted positive and negative frequency components. More particularly, based upon the comparison value, controller 530 may cause blending circuit 540 to output the received positive and negative frequency components, either unmodified or adjusted in some form. Depending upon implementation, the adjustment may be a replacement of one of the frequency components with the other frequency component. Or the adjustment may take the form of some combination of the two frequency components, details of which are described further below. Understand while shown at this high level in the embodiment of FIG. 5, many variations and alternatives are possible.

In one particular embodiment, a processing circuit may be configured to perform a compare, select and duplicate function where, based upon the comparison that is performed between the frequency components, a higher valued one of the frequency components is identified as the likely noisier one of the frequency components and is discarded and the other frequency component is duplicated into the discarded frequency component (with an inversion of the imaginary axis).

Figure 6:
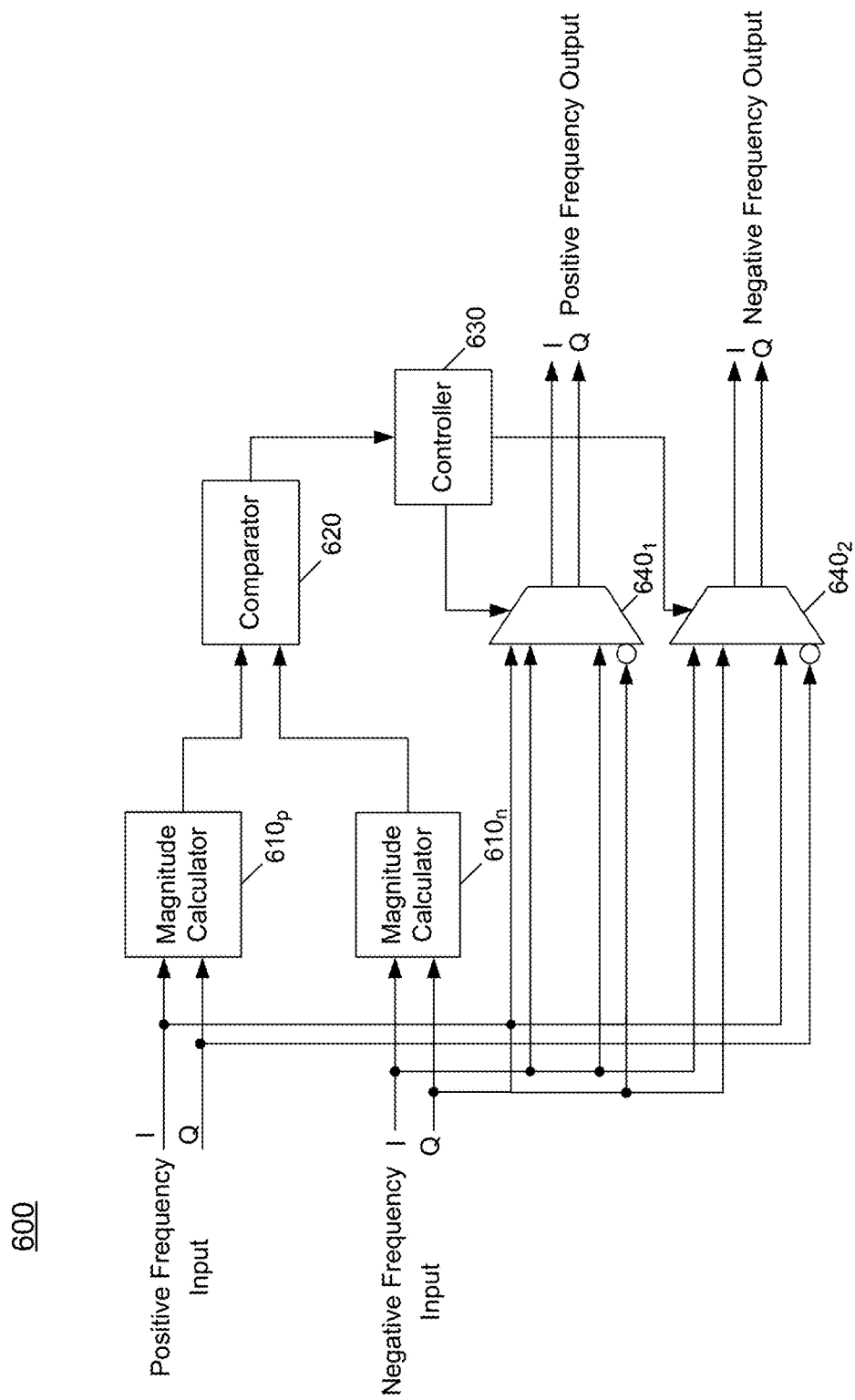
FIG. 6 is a block diagram of a processing circuit in accordance with another embodiment.

Referring now to FIG. 6, shown is a block diagram of a processing circuit in accordance with another embodiment. As shown in FIG. 6, processing circuit 600 may be a single one of multiple such processing circuits, each configured to operate on a pair of corresponding sub-bands. As seen, incoming complex signals are received for the positive and negative frequency components in corresponding magnitude calculators $610_{p,n}$. In an embodiment, each magnitude calculator 610 may generate a magnitude value according to: $I^2+Q^2$. The magnitudes generated in magnitude calculators $610_{p,n}$ are provided to a comparator 620, which is configured to output a comparison value that is a difference between the magnitudes (and, e.g., based on sign, which of the magnitudes is greater). This comparison output is provided to a controller 630.

In embodiments, controller 630 is configured to control a pair of selection circuits $640_1$ and $640_2$, which may be implemented as multiplexers. Based upon control signals from controller 630 (which in turn generates the control signals based on the comparison result), selection circuits 640 are controlled to pass the lower magnitude frequency component, and replace the higher magnitude frequency component with the complex conjugate of the lower magnitude frequency component.

As such, in processing circuit 600, the magnitude of the two frequency components are compared, and the smaller is duplicated into the opposite band with an inversion of the imaginary axis. If an interferer is present at this frequency, then the larger magnitude will (in most cases) represent the corrupted signal, and the smaller will likely represent the uncorrupted signal. Understand while shown at this high level in the embodiment of FIG. 6, many variations and alternatives are possible. For example, other algorithms can be used for comparing and selecting. As one such example, time-delayed data from previous and future sample blocks can be used to refine the choice, or adjacent frequency bins can be used to modify the choice process. For example, if the interferer happens to be at the same frequency as a desired signal and out of phase, then the lower power will be on the corrupted sideband, which would be the wrong choice for a simple compare, select and duplicate function as in FIG. 6. Since it is very unlikely that the phase of the interferer will be precisely wrong for multiple sample block periods, the selection can be done using historical information as additional criteria, in some embodiments.

Figure 7:
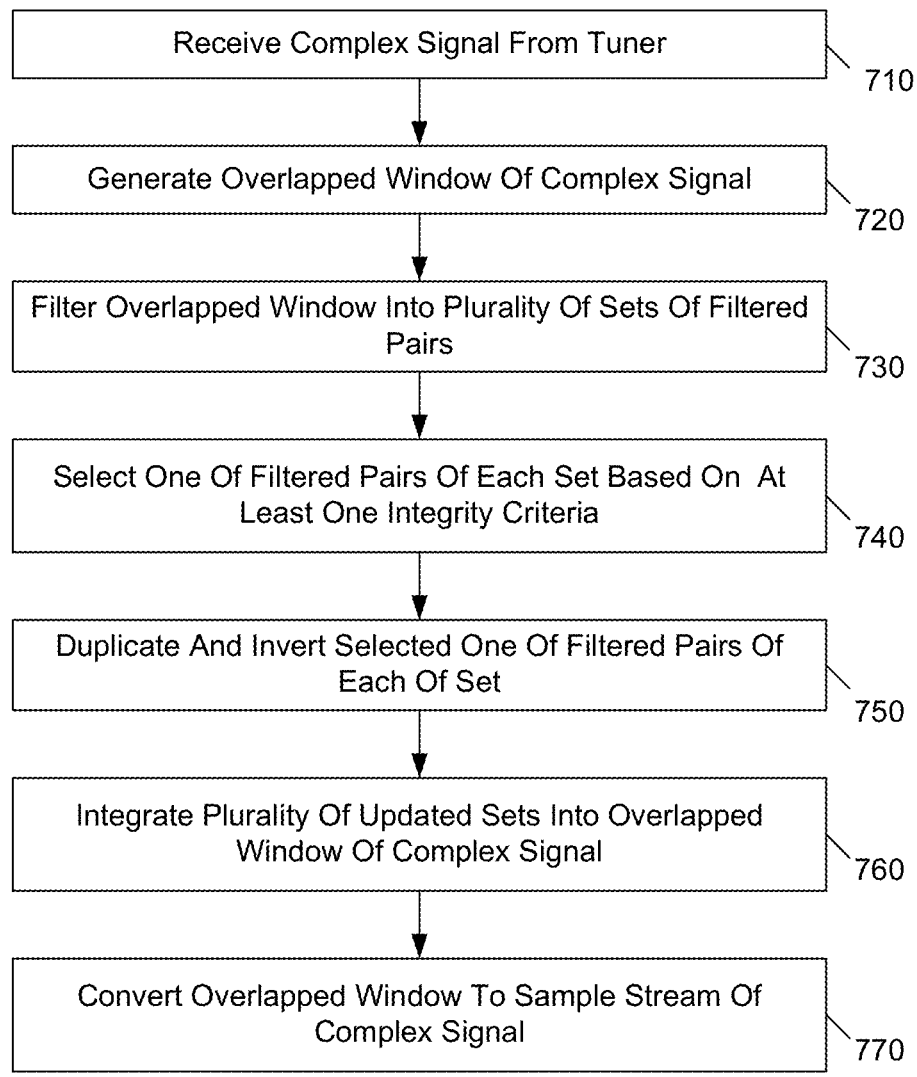
FIG. 7 is a flow diagram of a method in accordance with an embodiment.

Referring now to FIG. 7, shown is a flow diagram of a method in accordance with an embodiment. As shown in FIG. 7, method 700 is an example implementation of a method for performing noise cancellation in AM signal processing. As such, method 700 may be performed by hardware circuitry, firmware, software and/or combinations thereof. In a particular embodiment, method 700 may be performed in a hardware noise cancellation circuit such as described herein.

As seen, method 700 begins by receiving a complex signal from a tuner (block 710). This complex signal may be received as a signal stream of samples of incoming I and Q values. Next at block 720 an overlapped block or window of samples of the complex signal may be generated. As described herein, the overlapping block may have a width of 2048 samples, and the overlapped block contains some portion of all 2048 samples, although the system only advances 1024 samples at a time, in that 1024 of the samples overlap the previous block and 1024 samples are saved to be used to overlap the next block.

Thereafter at block 730 this overlapped window is filtered into multiple sets of filtered pairs. More specifically, 2046 pairs of filter sets in the frequency domain may be generated, namely 1023 positive and 1023 negative frequency components, with DC (Tone 0) and FS/2 (Tone 1024) treated differently. Note that these pairs are symmetric about DC, such that each filtered pair includes a positive frequency component and a negative frequency component. And in turn, each frequency component itself is formed of a complex value, namely I and Q values.

Next one of the filtered pairs of each set is selected (block 740). More specifically, based on one or more integrity criteria and the samples themselves, the one of these filtered pairs that has less noise content may be selected. In general, the criteria may be based upon a comparison of the symmetric components to identify which of the two symmetric frequency components likely has greater noise content. The selected one of the filtered pair may thus be the one of the two symmetric frequency components having less noise content.

Control passes next to block 750 where the selected one of the filtered pairs may be duplicated and inverted to replace the other of the filtered pairs that has been identified to have greater noise content. Thereafter, the processed filtered pairs are passed to a re-integrator, where at block 760 the multiple updated sets can be integrated into an overlapped window of the complex signal. Then at block 770 this overlapped window may be converted back to the time domain as a sample stream of the complex signal, which is passed to further signal processing circuitry, e.g., for demodulation. Note that the splitting and re-integrating of the signal stream may occur via a unity process, such that no underlying content within the signal stream is lost. Also, while in the high level view of FIG. 7, a compare, select and duplicate function is performed, other signal processing may be performed in other embodiments to remove undesired noise content from at least one of the two sidebands.

Figure 8:
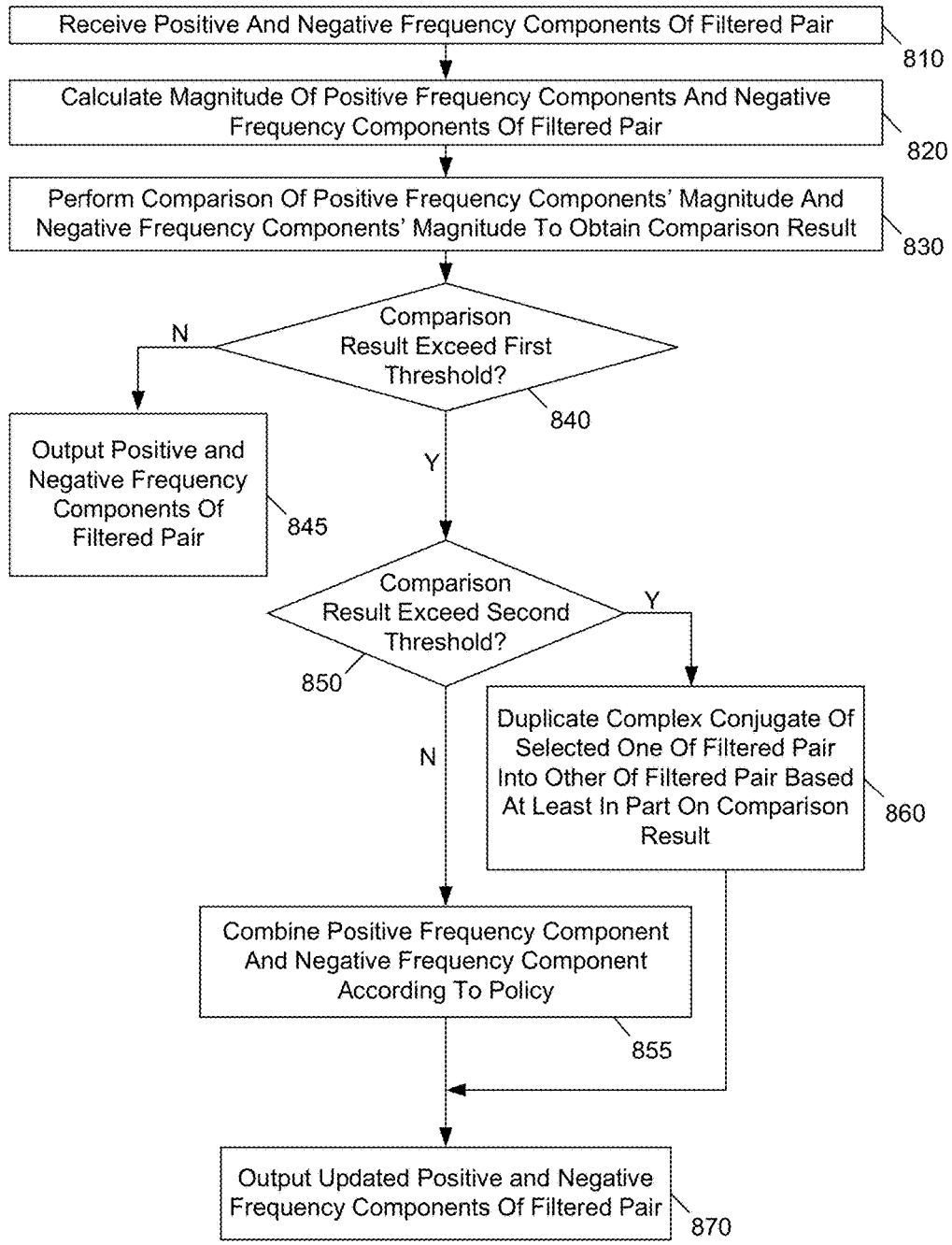
FIG. 8 is a flow diagram of a method in accordance with another embodiment.

Referring now to FIG. 8, shown is a flow diagram of a method in accordance with another embodiment. As shown in FIG. 8, method 800 is an example implementation of a method for performing noise cancellation in AM signal processing. As such, method 800 may be performed by hardware circuitry, firmware, software and/or combinations thereof. In a particular embodiment, method 800 may be performed in a hardware noise cancellation circuit such as described herein.

At block 810, positive and negative frequency components of a filtered pair may be received within the processing circuit. Next at block 820 magnitudes may be calculated for the different frequency components. More specifically, a first magnitude may be calculated for the positive frequency component and a second magnitude may be calculated for the negative frequency component. Although embodiments are not limited in this regard, in one embodiment the magnitude may be determined by performing a sum of squares of the individual complex (I and Q) components.

Still with reference to FIG. 8, at block 830 a comparison may be performed between these magnitudes to obtain a comparison result. In one embodiment, the comparison may be implemented as a difference calculation, to thus identify a magnitude of the difference, along with an identification of which of the two components is of greater magnitude (e.g., as determined based upon the sign of the comparison result).

Still with reference to FIG. 8, it is determined whether the comparison result exceeds a first threshold (diamond 840). This threshold may correspond to a relatively low level of mismatch, e.g., on the order of between approximately 5% and 10% mismatch relative to the power in the entire signal. If it is determined that the comparison result does not exceed this low level threshold, control passes to block 845 where the positive and negative frequency components (unmodified) of the filtered pair may be output. Note that these frequency components are output to a reintegrator where the reintegration process may be performed using these frequency components of this filtered pair, along with the potentially adjusted frequency components of the additional frequency pairs.

Still with reference to FIG. 8, if it is determined that the comparison result exceeds the first threshold, control passes to diamond 850 to determine whether the comparison result exceeds a second, higher threshold. In an embodiment, this second threshold may be set at a higher level, to indicate a greater difference between the magnitudes, e.g., on the order of between approximately 10% and 50% mismatch. Note that in some embodiments, this second threshold and the first threshold may be dynamically updated based on a calculated noise floor. If it is determined that the comparison result does not exceed this second threshold, control passes to block 855 where an adjustment operation may be performed. More specifically, in this adjustment operation at block 855, the positive and negative frequency components may be combined according to a given policy. As one example, some type of combining ratio may be used to combine the frequency components. For example, the higher magnitude may include some undesired amount of noise. As such, some percentage of the lower magnitude frequency component can be combined with a given percentage of the higher magnitude frequency component. As one particular example, some lesser percentage of the lower magnitude frequency component may be combined with some greater percentage of the higher magnitude frequency component. Of course other examples are possible, and it is possible also to modify the lower magnitude component. Thereafter, these updated positive and negative frequency components of a filtered pair may be output, as discussed above (block 870).

Instead if it is determined at diamond 850 that the comparison result does in fact exceed the second threshold, control passes to block 860. At block 860 a duplicate operation may be performed to replace signal information of the frequency component having greater noise content with the signal information of the frequency component having lower noise content. As illustrated at block 860, this duplication process may operate to cause the complex conjugate of the selected one of the filtered pair to be duplicated into (and thus replace) the other of the filtered pair. Understand while shown with this particular type of selection criteria, other examples of determining when and what type of adjustment to be performed may occur.

Figure 9:
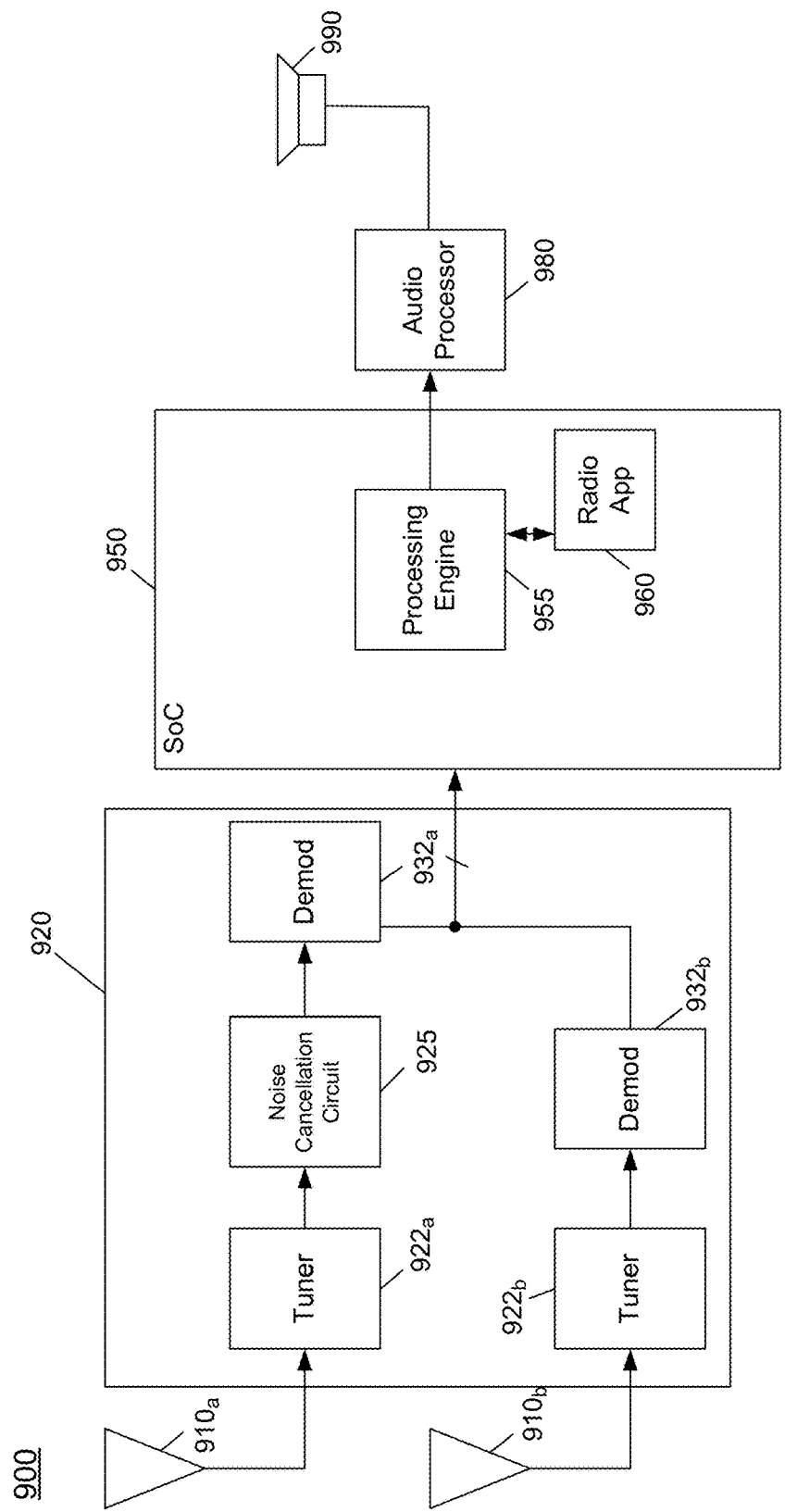
FIG. 9 is a block diagram of a system in accordance with an embodiment.

Referring now to FIG. 9, shown is a block diagram of a system in accordance with an embodiment. As shown in FIG. 9, system 900 is at least a portion of a vehicle infotainment system. As illustrated, system 900 includes various components adapted on a circuit board, as well as additional components that may be located in other portions of a vehicle.

In the embodiment shown in FIG. 9, incoming radio frequency (RF) signals are received by multiple antennas $910_a$, $910_b$ (generically antennas 910). Understand while two antennas are shown for purposes of discussion, in different implementations a vehicle may be adapted with only a single antenna or more than two antennas, as appropriate for a given tier of radio solution, as well as desired bands of service. For purposes of discussion herein, assume that antennas 910 are configured to receive digital radio communications in accordance with one or more digital radio standards such as DAB, HD radio, digital radio mondiale (DRM) or so forth, analog radio stations (e.g., AM and FM) and potentially other broadcast signaling, including video signaling, e.g., according to a digital media broadcast (DMB) standard.

Received RF signals from antennas 910 are in turn provided to an integrated circuit 920, which in an embodiment may include a single semiconductor die. As illustrated, integrated circuit 920 may include multiple signal processing paths. For ease of illustration only two signal processing paths are shown, however understand that a given receiver and tuner IC may include more than two such paths to receive, downconvert and process radio signals of many different bands and modulation schemes. As illustrated, received RF signals from antennas 910 are provided to corresponding tuners $922_a$, $922_b$ (generically tuner 922). Tuners 922 may be multi-band tuners to receive and process RF signals of different bands. In general, tuners 922 may include RF front end circuitry such as a LNA and other gain control circuitry, mixer, filter, digitizer and so forth that operate to receive and process the RF signal and generate a resulting digitized signal at a downconverted frequency. For example, tuners 922 may be configured to output signals at baseband, zero intermediate frequency (ZIF) or low IF or other downconverted level. In embodiments, tuners 922 may output such signals in digitized form.

As further illustrated in FIG. 9, resulting digitized signals are provided to demodulators $932_{a,b}$. Demodulation circuits $932_{a,b}$ may receive incoming signal information from one of tuners $922_a$, $922_b$. In turn, demodulator circuits 932 operate to demodulate the incoming signals, which are received in a modulated form. In general, demodulator circuits 932 may include various circuitry including asynchronous sample rate converters, decoder circuitry and so forth. As such, demodulator circuits 932 output demodulated signals, which are output from IC 920.

Note with reference to the first signal processing path including tuner $922_a$ and demodulator $932_a$, interposed therebetween is a noise cancellation circuit 925. Noise cancellation circuit 925 may implement an embodiment herein to perform noise cancellation of downconverted AM signals. To this end, noise cancellation circuit 925 may remove a source of noise interference such as may be generated by an electric motor or other electrical components present in a vehicle such as an electric or hybrid vehicle. As such, noise cancellation circuit 925 may output noise-compensated signals for demodulation in demodulator $932_a$.

Still with reference to FIG. 9, demodulated signals output from demodulators 932 are provided to a system on chip (SoC) 950, which is a main processor of infotainment system 900. As illustrated in FIG. 9, SoC 950 includes a processing engine 955. Although a single processing engine is shown for ease of illustration, understand that in various implementations, multiple processing engines may be provided. As examples, processing engine 955 may be implemented as one or more general-purpose processor cores, one or more DSPs, and/or one or more other programmable logic circuits.

SoC 950 is additionally shown to include a radio application 960, which in an embodiment may be a high level radio application of the system and which may execute on processing engine 955. Radio application 960 may act as an interface to receive user input (e.g., a request for a given radio station) and provide instructions to additional components to effect the requested functionality.

Note that while radio application 960 is illustrated as a separate component within SoC 950, understand that it may be implemented as software and/or firmware that executes on processing engine 955 or other programmable circuitry within SoC 950. As such, whether implemented as software or firmware, instructions are stored in a non-transitory storage medium. Such storage medium may be implemented within SoC 950 itself such as an internal non-volatile memory or an external memory such as an external flash memory of system 900. Understand further that while a particular delineation of components is shown in FIG. 9, other implementations are possible.

As further shown in FIG. 9, processing engine 955 outputs audio signals which may be provided to an optional audio processor 980. Audio processor 980 may perform additional audio processing such as post-processing, balance control, fading, and so forth. In turn, audio processor 980 outputs audio signals to one or more speakers 990. Understand while shown at this high level in the embodiment of FIG. 9, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving, in a noise cancellation circuit of a receiver, a plurality of samples of a downconverted signal;
   separating the plurality of samples into a plurality of sub-bands;
   for each of corresponding pairs of the plurality of sub-bands, comparing a first value based on a first component of the corresponding pair with a second value based on a second component of the corresponding pair;
   based at least in part on the comparing, adjusting at least a portion of one of the first and second components of the corresponding pair with at least a portion of the other of the first and second components of the corresponding pair;
   integrating the plurality of sub-bands into a second plurality of samples; and
   outputting the second plurality of samples for demodulation.

2. The method of claim 1, further comprising receiving a complex signal and forming an overlapping window having the plurality of samples.

3. The method of claim 1, further comprising:
   performing a complex fast Fourier transform to separate the plurality of samples into the plurality of sub-bands; and
   performing a complex inverse fast Fourier transform to integrate the plurality of sub-bands into the second plurality of samples.

4. The method of claim 1, wherein the separating and the integrating comprises a unity function.

5. The method of claim 1, wherein:
   calculating the first value comprises calculating a first magnitude for the first component, the first component comprising a positive frequency component of the corresponding pair of the plurality of sub-bands; and
   calculating the second value comprises calculating a second magnitude for the second component, the second component comprising a negative frequency component of the corresponding pair of the plurality of sub-bands.

6. The method of claim 5, further comprising comparing the first magnitude to the second magnitude to obtain a comparison result.

7. The method of claim 6, further comprising in response to the comparison result exceeding a first threshold, replacing one of the positive frequency component and the negative frequency component with a complex conjugate of the other of the positive and negative frequency components.

8. The method of claim 6, further comprising in response to the comparison result exceeding a second threshold, combining at least a portion of one of the positive frequency component and the negative frequency component with at least a portion of the other of the positive frequency component and the negative frequency component, the second threshold less than the first threshold.

9. An apparatus comprising:
   an analog front end circuit to receive and downconvert an amplitude modulation (AM) signal to a second frequency signal;
   a digitizer to digitize the second frequency signal into a plurality of samples;
   a noise cancellation circuit coupled to the digitizer to receive the plurality of samples, the noise cancellation circuit comprising:
   a window generator to generate a window having a first set of the plurality of samples;
   a band splitter to split the window into a plurality of pairs of symmetric frequency components;

a processing circuit, for each of the plurality of pairs, to:
  compare a first magnitude of a first symmetric frequency component to a second magnitude of a second symmetric frequency component and modify one of the first symmetric frequency component and the second symmetric frequency component based on the comparison;
an integrator to integrate the plurality of pairs output from the processing circuit; and
a second window generator to generate a second window having a second set of samples; and
a demodulator coupled to the noise cancellation circuit to demodulate the second set of samples to output a demodulated AM signal.

10. The apparatus of claim 9, wherein the band splitter comprises a fast Fourier transform engine and the integrator comprises an inverse fast Fourier transform engine.

11. The apparatus of claim 9, wherein the processing circuit comprises a plurality of individual circuits, each of the plurality of individual circuits comprising:
a first value generator to generate the first magnitude of the first symmetric frequency component, the first symmetric frequency component comprising a complex signal;
a second value generator to generate the second magnitude of the second symmetric frequency component, the second symmetric frequency component comprising a complex signal; and
a comparator to compare the first magnitude to the second magnitude and to output a comparison result based thereon.

12. The apparatus of claim 11, further comprising:
a controller to receive the comparison result and to output one or more control signals based on a comparison of the comparison result to at least one threshold; and
a blending circuit to modify the one of the first symmetric frequency component and the second symmetric frequency component based on the one or more control signals.

13. The apparatus of claim 12, wherein the controller is to replace the second frequency component with the first frequency component, when the comparison result exceeds the at least one threshold.

14. The apparatus of claim 12, wherein the at least one threshold comprises a dynamic threshold based on a dynamically calculated noise floor.

15. The apparatus of claim 12, wherein the controller is to cause the blending circuit to output the first symmetric frequency component and the second symmetric frequency component unmodified when the comparison result is less than the at least one threshold.

16. The apparatus of claim 11, wherein the window generator is to generate the window comprising at least some overlapping samples of a prior window, and the second window generator is to generate the second window that overlaps at least a portion of the prior window.

17. The apparatus of claim 9, wherein the noise cancellation circuit is to remove noise present in a first sideband of the AM signal caused by one or more electrical components of a vehicle, the apparatus comprising a radio receiver of the vehicle.

18. A system comprising:
an antenna to receive an amplitude modulation (AM) signal;
a tuner coupled to the antenna to receive and process the AM signal to output a downconverted modulated signal;
a noise cancellation circuit coupled to the tuner to:
  generate a window having a first set of a plurality of samples of the downconverted modulated signal;
  split the window into a plurality of pairs of symmetric frequency components;
  for one or more of the plurality of pairs, to:
    compare a first magnitude of a first symmetric frequency component to a second magnitude of a second symmetric frequency component and modify one of the first symmetric frequency component and the second symmetric frequency component based at least in part on the comparison; and
  integrate the plurality of pairs into a second window having a second set of samples;
a demodulator coupled to the noise cancellation circuit to demodulate the second set of samples to output a signal stream; and
an output device to play the signal stream.

19. The system of claim 18, wherein the noise cancellation circuit is to modify the one of the first symmetric frequency component and the second symmetric frequency component by replacement of the second frequency component with a representation of the first frequency component, when a comparison result of the first magnitude to the second magnitude exceeds a threshold.

20. The system of claim 18, wherein the system comprises a vehicle infotainment system, wherein the noise cancellation circuit is to compensate for a source of noise present in an electric vehicle or a hybrid electric vehicle having the vehicle infotainment system.

* * * * *